Patented Jan. 15, 1946

2,393,134

UNITED STATES PATENT OFFICE 2,393,134

DL-TOCOPHEROLESTER

John A. Aeschlimann, Montclair, N. J., assignor to Hoffmann-La Roche, Inc., Nutley, N. J., a corporation of New Jersey No Drawing. Application May 11, 1942, Serial No. 442,523. In Switzerland May 15, 1941

1 Claim. (Cl. 260—333)

My invention is concerned with the production of suitable biologically active and well-crystallized esters of tocopherol.

Of the various crystalline esters of dl-alpha-tocopherol described in the literature, the p-nitrophenyl-urethane and allophanate are known to be devoid of biological activity (Karrer, Helv. 1938, 21, 523). The stearate (Karrer, Helv. 1939, 22, 65) is active but owing to the high molecular weight of the acid moiety it contains only 60% of dl-alpha-tocopherol. The benzoate has been described as an oil, the dinitrobenzoate described along with the nitrophenylurethane has apparently been assumed to be inactive.

It will be seen, therefore, that no crystalline, biologically active ester of dl-alpha-tocopherol which would contain a high percentage of dl-alpha-tocopherol was known prior to my invention. It is, therefore, an object of my invention to produce such esters and to find a suitable process for making them.

I have now found that the p-nitrobenzoate of dl-alpha-tocopherol crystallizes readily and is biologically active. It can be reduced to the p-aminobenzoate which crystallizes very readily. Furthermore, the dimethylamino-benzoate is also crystalline and can be obtained from the easily accessible dimethylaminobenzoyl chloride. It can be converted into water-soluble quaternary salts.

Instead of pure tocopherols crude products, for instance, the crude condensate of nucleus-alkylated hydroquinones and phytol or derivatives thereof, can be subjected to the esterification. Furthermore, it is possible to condense the corresponding mono-esters of hydroquinones with phytol or the derivatives thereof.

The compounds serve to characterize tocopherol. Insofar as they are biologically active, they are suitable for the manufacture of stable preparations for the treatment of E-avitaminosis.

Example 1

A mixture of 5 parts by weight of dl-alpha-tocopherol, 4 parts by weight of p-nitro-benzoyl-chloride and 20 parts by weight of pyridine is heated for 1 hour in a steam bath and the pyridine then removed under a pressure of 14 mm. The residue is taken up in water, extracted with 50 parts by weight of petroleum ether and several times with 10% hydrochloric acid in order to remove pyridine and then with a 10% solution of sodium carbonate to remove nitro-benzoic acid. After washing with water, drying with calcium chloride and evaporation there remains a viscous oil which only gradually solidifies over wax on standing in a desiccator for 2 days. The ester dissolves in warm ethanol and methanol and crystallizes in the cold from dilute solutions. It melts at 41° C. Found C=74.3%, H= 8.97%, calculated $C_{36}H_{53}O_5N$, C=74.6%, H=9.03%.

The solution of nitro-benzoic acid ester is hydrogenated in glacial acetic acid in presence of palladium charcoal for 4 hours until the absorption of hydrogen ceases, the catalyst sucked off and several times washed with water. The ester is now extracted several times from the turbid acetic solution with ether, the ether layer poured through the palladium charcoal on the suction filter which retains the principal portion of the ester, the ether solution then washed several times with soda and water, and evaporated. The solid residue is recrystallized from methyl-alcohol. Melting point 141° C. p-Amino-benzoyl-dl-alpha-tocopherol is soluble in ether and benzene and somewhat less soluble in petroleum ether, little soluble in cold methanol and ethanol and insoluble in aqueous acids.

Example 2

A mixture of 5 parts by weight of dl-alpha-tocopherol, 3 parts by weight of p-dimethyl-amino-benzoyl-chloride (Helvetica Chimica Acta, vol. 8, year 1925, page 493) and 10 parts by weight of pyridine is boiled for 1 hour in an oil bath heated to 140° C. The pyridine is now evaporated in vacuo, the residue treated with water and ether, and the ether layer washed several times with dilute hydrochloric acid and thereupon with soda, dried and evaporated. On trituration with alcohol the residue (7 parts by weight) solidifies to crystals and crystallizes well from warm alcohol. Melting point 42° C. Found C=78.92%, H=10.6%, $C_{38}H_{59}O_3N$ calculated, C=78.98%, H=10.3%.

On warming with dimethyl-sulphate the quaternary methylsulphate is obtained which can be transformed into the bromide by means of aqueous potassium-bromide solution. These salts give strongly foaming aqueous solutions.

I claim:

Crystalline dl-alpha-tocopherol-p-nitro-benzoic acid ester.

JOHN A. AESCHLIMANN.